United States Patent [19]
Bentley

[11] 3,872,666
[45] Mar. 25, 1975

[54] METHOD, SYSTEM AND APPARATUS FOR CONTROLLING TEMPERATURES OF EXHAUST GASES IN EMISSION CONTROL SYSTEMS

[75] Inventor: David R. Bentley, Temperance, Mich.

[73] Assignee: Questor Corporation, Toledo, Ohio

[22] Filed: Oct. 4, 1972

[21] Appl. No.: 294,951

[52] U.S. Cl. ............... 60/277, 23/277 C, 23/288 F, 60/277, 60/286, 60/289, 60/298, 423/212

[51] Int. Cl.............................................. F01n 3/14

[58] Field of Search ............ 60/274, 277, 286, 289, 60/298, 310, 317, 39.09 R, 39.5, 223; 23/277 C, 288 F; 423/212

[56] References Cited
UNITED STATES PATENTS

| | | | |
|---|---|---|---|
| 2,206,258 | 7/1940 | Laguzzi | 60/310 |
| 2,469,679 | 5/1949 | Wyman | 60/39.5 |
| 3,086,353 | 4/1963 | Ridgway | 60/289 |
| 3,302,394 | 2/1967 | Pahnke | 60/302 |
| 3,303,003 | 2/1967 | Zimmer | 60/289 |
| 3,338,682 | 8/1967 | Fowler | 60/288 |
| 3,481,144 | 12/1969 | Morrell | 60/283 |
| 3,738,108 | 6/1973 | Goto | 60/277 |
| 3,741,713 | 6/1973 | Reed | 23/277 C |

*Primary Examiner*—Douglas Hart

[57] ABSTRACT

The disclosure embraces a method, system and apparatus for controlling temperatures of exhaust gases in an emission control system or arrangement and is inclusive of a method and apparatus for reducing excessive temperatures in an exhaust gas receiving chamber which may result from malfunction of normal engine operation wherein such excessive temperatures may exceed the critical temperatures of the materials used in the construction of exhaust emission control devices, the method and apparatus involving interruption of air flow to the exhaust gas receiving chamber to retard or reduce oxidation or combustion in the system and the concomitant delivery of a heat-absorbing or quenching fluid into the system to rapidly absorb and dissipate excessive thermal energy.

25 Claims, 9 Drawing Figures

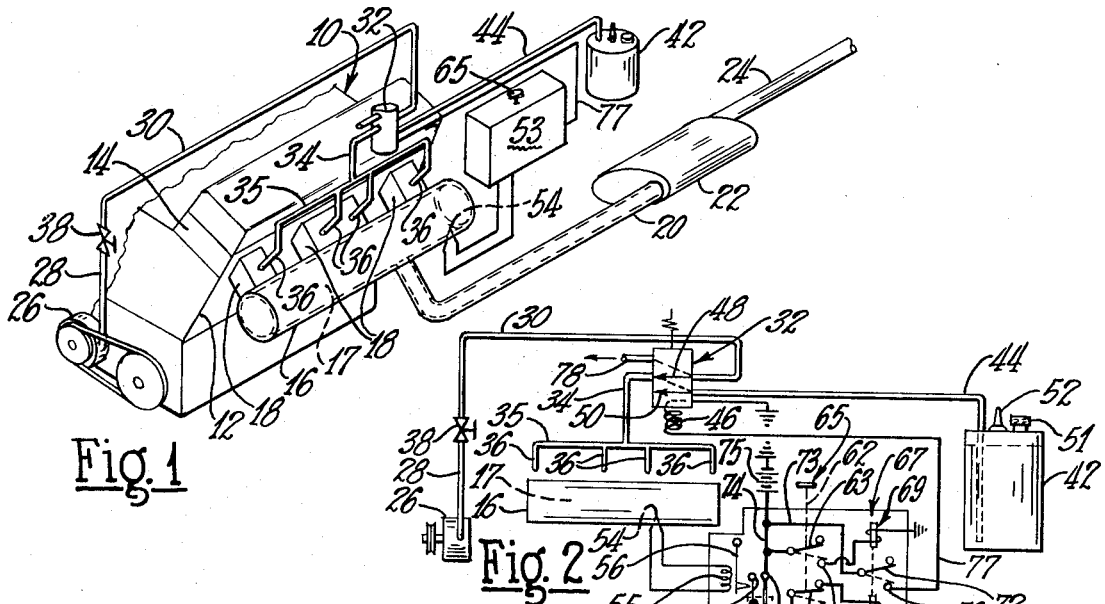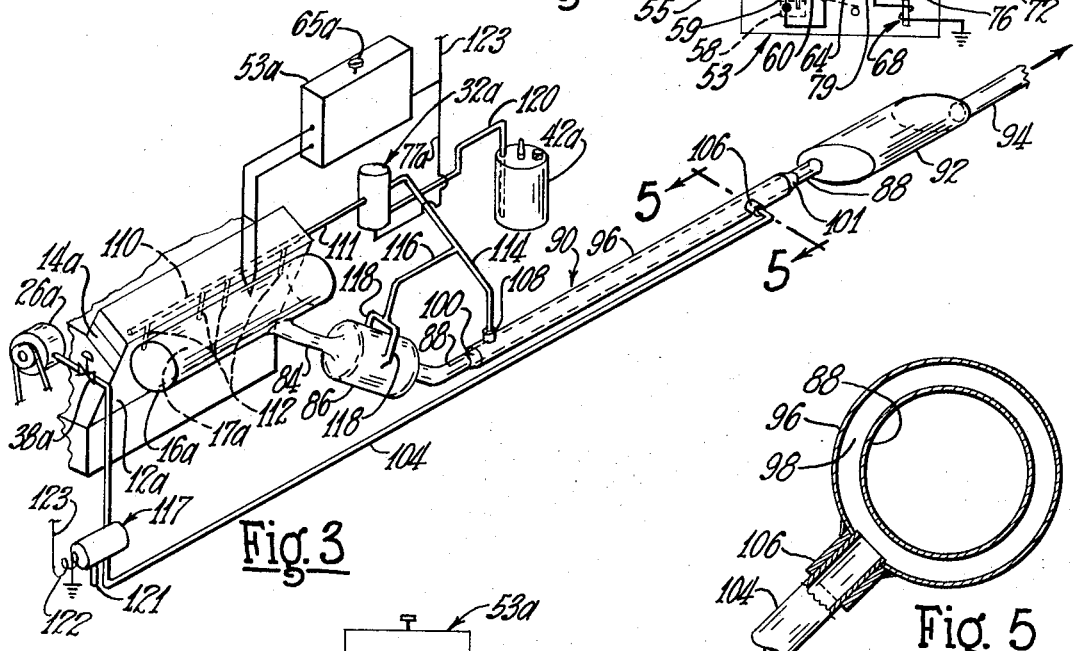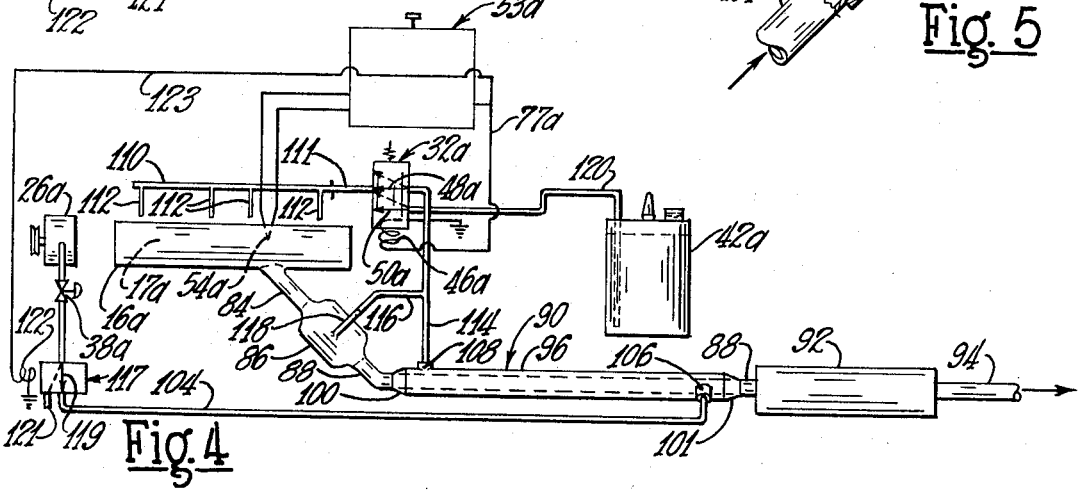

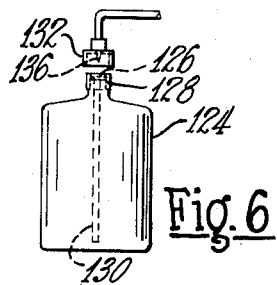
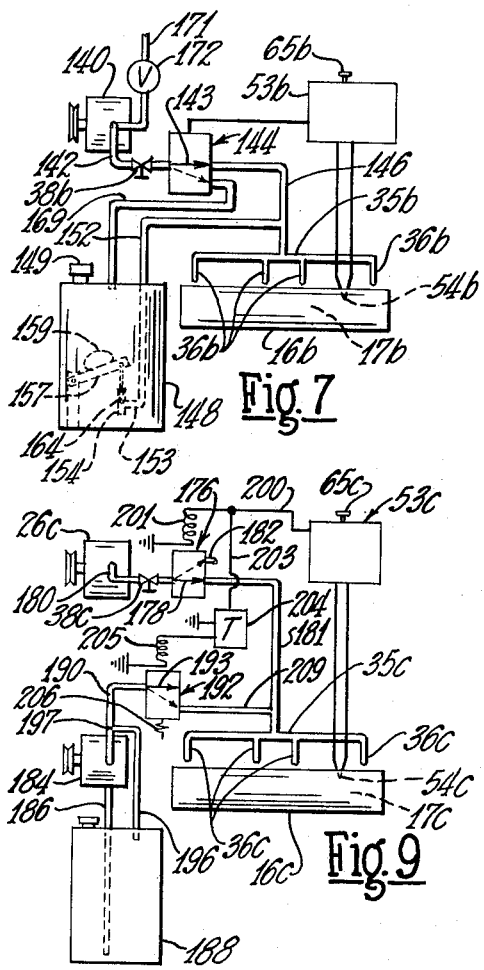
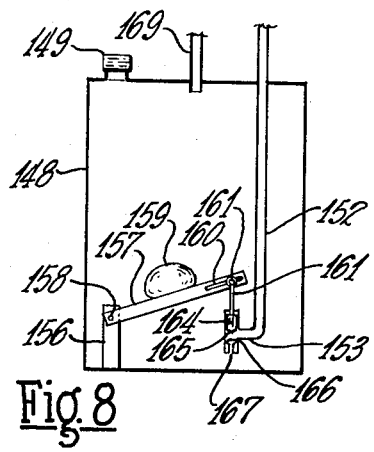

METHOD, SYSTEM AND APPARATUS FOR CONTROLLING TEMPERATURES OF EXHAUST GASES IN EMISSION CONTROL SYSTEMS

In recent developments pertaining to emission control devices for exhaust gas systems of internal combustion engines in promoting combustion or oxidation of unburned constituents in the exhaust gases, a controlled or restricted amount of air is flowed or delivered into the high temperature exhaust gases in a manifold or chamber in order to effect some oxidation of unburned constituents in the gases. Under normal operation of an internal combustion engine, the exhaust gases usually contain a substantially constant amount of unburned constituents, and the admission of air at a restricted or controlled rate into the exhaust gases in a manifold or chamber effects oxidation or combustion of unburned constituents at a rate which will normally increase the temperatures in the exhaust gas system but still maintain the temperatures below critical temperatures which would result in damage to or failure of components of the system. However, in event of engine misfire or malfunction conditions wherein an increase in unburned combustible mixture is delivered into the exhaust gases, such excess of fuel burned or combusted in the exhaust system may increase the temperatures above the critical temperatures of the materials of which the exhaust gas conveying means is constructed and result in destructive impairment of the system.

The invention embraces the provision of a method or control system in association with an arrangement for flowing air into exhaust gases from an internal combustion engine to promote oxidation or combustion of unburned constituents in the exhaust gases in a chamber or exhaust gas conveying means wherein upon an abnormal or excessive increase in temperature of the gases in the chamber or exhaust gas conveying means, the control system is rendered effective to interrupt air flow into the exhaust gases and reduce or retard combustion or oxidation of unburned combustible constituents in the exhaust gases in the chamber or exhaust gas conveying means.

The invention has for an object the provision of a method or system in association with an arrangement for flowing air into exhaust gases for burning or oxidizing unburned constituents in the exhaust gases in a chamber or passage wherein upon increase in temperature of burning gases in the chamber to a predetermined excessively high temperature, the air flow is interrupted and a heat-absorbing fluid delivered into the region of high temperature to rapidly absorb and dissipate the thermal energy and thereby rapidly reduce the excessive temperature in the chamber or passage.

Another object of the invention resides in a method or system for use with an arrangement wherein a controlled or limited amount of air is flowed into the exhaust gases to promote increased combustion or oxidation of unburned constituents in the exhaust gases and wherein upon a predetermined increase in temperature, a temperature sensing medium is effective to activate means to interrupt or reduce the air flow and initiate rapid delivery of heat-absorbing oxidation retarding fluid into the gases to rapidly reduce the temperature of the gases.

Another object of the invention resides in the provision of over-temperature control of exhaust gases emitted from an internal combustion engine into a chamber or passage in which oxidation is occurring of oxidizable constituents in the exhaust gases increasing the temperature of the exhaust gases, the control including establishing flow of a heat-absorbing fluid into the exhaust gases when the exhaust gases reach a predetermined temperature whereby the fluid rapidly absorbs the thermal energy and thereby reduces the temperature of the exhaust gases.

Another object of the invention resides in an over-temperature control system for preventing overheating of a passage means or chamber receiving exhaust gases emitted from an internal combustion engine in which passage means or chamber oxidation of unburned constituents in the exhaust gases is promoted by flowing preheated air into the exhaust gases and thereby increasing the temperature of the exhaust gases, the system including establishing flow of heat-absorbing fluid into the exhaust gases when the exhaust gases reach a predetermined high temperature and concomitantly interrupting flow of air into the exhaust gases whereby the fluid rapidly absorbs the thermal energy to thereby rapidly reduce the temperature of the exhaust gases.

Another object of the invention resides in a system for an exhaust gas conveying arrangement receiving exhaust gases from an internal combustion engine including a catalytic reactor wherein air flow is normally established into the exhaust conveying system promoting oxidation of unburned constituents in the exhaust gases, and when the temperature of the exhaust gases in the arrangement reaches a predetermined value, air flow into the system is interrupted and a heat-absorbing fluid delivered into the exhaust conveying arrangement to rapidly absorb and dissipate thermal energy to reduce the reaction temperatures in the exhaust gas conveying arrangement.

Another object of the invention resides in the provision of an apparatus for controlling temperature of an exhaust gas conveying arrangement wherein the arrangement involving a catalytic reactor receives exhaust gases emitted from an internal combustion engine in which arrangement oxidation of unburned constituents in the exhaust gases is promoted by flowing air into the exhaust gases, the system comprising temperature responsive means disposed to be influenced by the temperature of the gases in the gas conveying arrangement, the temperature responsive means being effective at an excessively high temperature of the exhaust gases to activate means for interrupting flow of air into the exhaust gases and concomitantly effect delivery of oxidation retarding fluid into the exhaust gases to reduce the temperatures in the exhaust gas conveying arrangement.

Further objects and advantages are within the scope of this invention such as relate to the arrangement, operation and function of the related elements of the structure, to various details of construction and to combinations of parts, elements per se, and to economies of manufacture and numerous other features as will be apparent from a consideration of the specification and drawing of a form of the invention, which may be preferred, in which:

FIG. 1 is an isometric schematic view illustrating a portion of a V-type internal combustion engine of the reciprocating piston type in association with a form of apparatus or system for carrying out the method of the invention;

FIG. 2 is a schematic view of the circuitry for the arrangement shown in FIG. 1;

FIG. 3 is a semischematic view illustrating a portion of a V-type internal combustion engine wherein the exhaust system includes a catalytic reactor, the view illustrating a form of the invention associated with the exhaust system;

FIG. 4 is a schematic view of the arrangement shown in FIG. 3;

FIG. 5 is an enlarged detail sectional view taken substantially on the line 5—5 of FIG. 3;

FIG. 6 is an elevational view illustrating a form of pressurized container or receptacle adapted to contain a supply of combustion retarding fluid for use in the method of the invention;

FIG. 7 is a schematic view of an arrangement for carrying out the method of the invention in association with a modified form of means adapted to contain heat-absorbing combustion retarding fluid;

FIG. 8 is an enlarged view of the means shown in FIG. 7 adapted to contain a supply of heat-absorbing combustion-retarding fluid, and FIG. 9 is a schematic view illustrating a modified arrangement for carrying out the method of the invention.

The system and apparatus for carrying out the method of the invention are usable in association with an exhaust gas system of an internal combustion engine wherein air is normally delivered into the exhaust gases in an exhaust manifold, chamber or passage means for promoting combustion or oxidation of unburned constituents in the exhaust gases, the system and apparatus providing an overtemperature control for the exhaust gas conveying arrangement.

The method and apparatus of the invention have particular utility as an overtemperature control in association with an exhaust gas system embodying a catalytic reactor or conversion instrumentality for converting toxic or harmful constituents in the exhaust gases into inert or nontoxic gases or constituents, the invention being utilized for preventing over-heating of the exhaust gas conveying means including the reactor.

Referring to FIG. 1, there is illustrated schematically a portion of a V-type eight cylinder internal combustion engine 10 of the reciprocating piston type of a character conventionally used for powering automotive vehicles. The engine is inclusive of a cylinder block 12 to which is secured a cylinder head 14. A tubular member, housing or exhaust manifold construction 16 is secured to the cylinder block 12, the tubular member or manifold construction 16 providing a chamber or passage 17, the manifold 16 being fashioned with spaced tubular portions 18 providing passageways into which flow exhaust gases from the conventional exhaust ports in the cylinder block 12.

The engine or cylinder block 12 illustrated is that of an eight cylinder V-type engine, and the exhaust receiving manifold or member 16 receives exhaust gases from one group of four cylinders of the eight cylinder engine. A similar manifold construction is provided for the opposite side of the engine block 12 and is adapted to receive exhaust gases from the other four cylinders of the engine. It is to be understood that the method, system and arrangement of the invention may be used with internal combustion engines having two or more cylinders as well as with rotary engines.

The elongated member of exhaust manifold 16 is of generally cylindrical shape providing a passage means, chamber or zone 17, the manifold 16 being fashioned of material capable of withstanding the normal exhaust gas temperatures. The manifold 16 may be of single or double wall construction of material such as stainless steel, ceramic, cast iron or other high temperature resistant material.

Connected with the manifold 16 is a tubular member or pipe 20 providing a passage means or conduit for conveying exhaust gases from the manifold or member 16 into a sound attenuating device or muffler 22 which may be of conventional construction for attenuating sound waves entrained in the exhaust gas stream. The muffler 22 may be equipped with a tail pipe 24 for discharging the gases from the muffler into the atmosphere.

In the operation of an internal combustion engine, a combustible fuel and air mixture is delivered into the engine cylinders, the mixture compressed by compression movement of the engine pistons, and the mixture ignited at the proper time in the cylinders in a conventional manner. The hydrocarbon fuel in the combustible mixture delivered into the engine cylinders is not completely oxidized or combusted within the cylinders, and hence the hot exhaust gases delivered into the manifold or chamber 16 contain some unoxidized or unburned hydrocarbons, carbon monoxide and oxides of nitrogen.

These constituents in the exhaust gases are considered undesirable and contribute to air pollution. It is known that by feeding air under controlled conditions into the exhaust gases at the region of delivery of the gases from the cylinders into an exhaust manifold, chamber or passage, combustion or oxidation of unburned hydrocarbons and carbon monoxide ensues in the exhaust gases. Such combustion occurring in the exhaust manifold or chamber substantially increases the temperature of the exhaust gases in the manifold 16 and in the tubular members 18.

While the material of the manifold construction may be capable of withstanding the temperatures of the exhaust gases with combustion occurring in the gases in the manifold 16 and the tubular passages 18 under normal engine operation, an increase in exhaust gas temperature should not exceed the critical temperatures for the materials used in the construction of the manifold 16, the tubular passages 18 and the materials of the components conveying the exhaust gases away from the manifold 16.

However, in the event of misfire of one or more cylinders or an impairment enriching the fuel and air mixture, such condition results in substantial increase in the delivery of unburned or unoxidized constituents or combustibles and air in the mixture into the exhaust gases in the manifold 16. By reason of the increase of unburned or unoxidized constituents in the exhaust gases and the additional air delivered into such exhaust gases after they are emitted from the engine, substantial additional combustion or oxidation occurs in the manifold 16 to an extent that the temperatures may exceed the critical temperatures for the materials used in the construction of the manifold 16 and other associated components in contact with the excessively hot exhaust gases.

The present invention is inclusive of a method, system and apparatus for automatically effecting a rapid reduction in temperature of the exhaust gases and hence a reduction in the temperatures of the materials of the exhaust gas conveying means in event that the exhaust gases reach a predetermined or critical temperature. The method or system involves interrupting air flow into the exhaust gases at the region of delivery of the exhaust gases from the engine into the manifold 16.

Concomitantly with the reduction or interruption of air flow into the exhaust gases, a fluid having a high heat capacity to rapidly absorb and dissipate thermal energy is delivered into the exhaust gases in the manifold chamber 17 or other region of critically high temperature to rapidly reduce the temperatures of the exhaust gases, the manifold 16 and associated components and thereby prevent impairment of or damage to the engine.

The air supply arrangement illustrated in FIG. 1 is inclusive of an air pump 26 driven from the engine or by other suitable means for providing air under pressure which is conveyed from the pump by tubular means, passages or pipes 28 and 30 to a valve means 32 which may be solenoid actuated, and under normal operation through a pipe 34 to an air manifold pipe 35 and to branch pipes or tubes 36. The branch pipes 36 preferably extend through the walls of the tubular means 18 to facilitate delivery of air into the region of emission of exhaust gases from the exhaust ports of the engine.

The flow rate or amount of air delivered through the pipes is regulated or controlled by suitable means such as an adjustable valve means or restriction 38. In lieu of the valve means 38, the rate of flow or delivery of air into the exhaust gases in the tubular passages 18 may be controlled by employing air conveying tubular means or pipes of a particular size of by utilizing fittings having metering orifices.

The amount of air delivered through the pipes into the exhaust gases is regulated to effect oxidation or combustion of oxidizable constituents in the exhaust gases in the manifold 16, the tubular passages 18 and the passage means 20 so that the temperatures of the gases, resulting from oxidation occurring by reason of the additional air while being increased, do not exceed safe operating temperatures.

FIG. 2 illustrates schematically a form of arrangement for interrupting air flow and delivering a combustion or oxidation retarding fluid into the exhaust gases to rapidly reduce the oxidation or reaction temperatures in the manifold chamber 16, and other components of the arrangement. Under engine misfire or malfunction conditions, air flow is interrupted and oxidation or combustion retardant fluid automatically delivered under pressure into the exhaust gases.

As shown in FIGS. 1 and 2, a container or receptacle 42 is filled with oxidation retarding fluid, such as water, providing a supply thereof. A tubular means or pipe 44 connected with the container 42 is connected with the valve means 32. The valve means 32 illustrated schematically is a solenoid operated means activated from one position to another by an electrically energizable means or solenoid coil 46.

The solid line 48 of the valve means 32 is illustrative of the normal air flow path, and the solid line 50 indicates a channel to accommodate flow of oxidation retarding fluid when moved to the position indicated in broken lines. The container 42 is provided with a filler opening normally closed by a cap or closure 51. The container 42 may be equipped with a one-way valve 52 to which a hose may be temporarily attached for feeding compressed air or other gas into the container 42 for pressurizing the container. If desired, such gases as carbon dioxide, nitrogen, helium or argon may be used in lieu of compressed air for pressurizing the container 42.

The arrangement includes temperature sensing or temperature responsive means 54, such as a thermocouple, associated with the manifold 16. The thermocouple 54 is connected with a signal coil 55 in which electromotive forces are established under the influence of heat on the thermocouple 54. The components of the circuitry are preferably contained within a housing indicated at 53.

Associated with the signal coil 55 is a movably supported member or armature 56, the position of which is dependent upon the magnitude of the electromotive forces developed in the coil 55, and hence the position of the member 56 varies with variations of temperature in the manifold 16. Mounted on a block or member 58 of insulating material, shown in broken lines in FIG. 2, is a flexible or movable switch contact 59 and a relatively stationary contact 60. The distal region of the armature or member 56 is arranged to engage and actuate the movable contact 59 into engagement with the stationary contact 60 when the thermocouple 54 is subjected to a predetermined excessively high temperature in the manifold 16.

The block 58, or other means supporting the relatively movable and stationary contacts 59 and 60, is adjustable relative to the armature 56 whereby the position of the adjustable contact 59 may be varied with respect to the member or armature 56. Through this arrangement, the contacts 58 and 60 may be adjusted relative to the armature 56 whereby the contacts may be positioned to be closed under the influence of different temperatures in the manifold 16.

The closing of the contacts 59 and 60 completes a circuit initiating the activation of the movable valve element of the valve means 32 for interrupting flow of air from the air pump 26 through the branch tubes 36 into the manifold 16 and for concomitantly effecting delivery of oxidation retarding or quenching fluid from the pressurized container 42 through the branch tubes 36 into the tubular passages 18, shown in FIG. 1, and into the manifold 16. The circuitry for initiating these functions includes a double pole switch 62 having switch arms or members 63 and 64. The switch 62 in the embodiment illustrated is a manually operated switch provided with a manipulating button 65.

The circuit is inclusive of a latching relay construction 67 which includes a first solenoid 68 and a second solenoid 69. A switch member 72 is connected by a conductor 73 with a conductor 74, the latter being connected with a source of electric energy such as an accumulator or storage battery 75.

During normal engine operation, the solenoid 46 of the valve means 32 is de-energized and the movable valve element associated with the solenoid 46 is normally held in a position under the influence of a biasing spring (not shown) whereby the passage or channel 48 in the valve element establishes communication of the pipe 30 with the pipe 34 thereby providing a flow path for a limited or controlled amount of air through the branch tubes 36 into the tubular passages 18 and the manifold chamber 17 to promote limited or restricted oxidation or combustion of unburned constituents in the exhaust gases in the tubular passages 18 and in the manifold 16.

The relatively stationary and movable contacts 59 and 60 mounted upon the adjustable block 58 are normally in open circuit position as the temperature in the manifold 16 is below a temperature which would activate the armature or member 56 through the signal coil 55 to close the contacts. In event of malfunction, such as engine misfire, causing an increase in the amount of combustible mixture in the tubular passages 18 and the manifold 16, oxidation or combustion is substantially increased within the passages 18 and manifold 16 resulting in increased or excessively high temperatures at the region of the temperature sensing means or thermocouple 54.

The influence of the high temperature on the thermocouple 54 increases the electromotive forces in the coil 55, these forces activating or moving the armature or member 56, the latter, in turn, moving the relatively movable contact 59 into engagement with the contact 60. The closing of the contacts 59 and 60 completes a circuit through the switch member 64 to energize the solenoid 68 of the latching relay 67.

The energization of the solenoid 68 effects movement of the switch member 72 of the latching relay into engagement with contact 76, completing a circuit through conductor 77 to the solenoid coil 46 of the valve means 32. Energization of the solenoid coil 46 shifts the movable member of the valve means 32 to move the valve channel 48 to its broken line position in registration with a vent tube 78, shown in FIG. 2, and moves the valve channel 50 to the broken line position.

The air flow channel 48 of the valve means, moved to the broken line position, interrupts the flow of air from the pump 26 to the pipe 34 and branch passages 36 in the tubular members 18 and thereby retards or reduces oxidation or combustion in the tubular members 18 and the manifold chamber 17. The air flow channel 48 of the valve means 32 in its broken line position in registration with the vent tube 78, vents the air from the air pump 26 through the vent tube 78 to the atmosphere.

Concomitantly, the channel 50 of the valve means 32 moved to the broken line position establishes communication of the pressurized container 42 through pipe 44, pipes 34, 35 and branch passages 36 with the manifold chamber 17. The oxidation retarding or quenching fluid, such as water, being under pressure, rapidly flows from the container 42 into the tubular members 18 and the manifold chamber 17 to rapidly quench or retard oxidation or combustion in the tubular passages 18 and the manifold 16. The fluid rapidly absorbs and dissipates the thermal energy to thereby lower the reaction temperature, thus avoiding possible damage to the materials of which the tubular passages 18 and manifold 16 are constructed or formed. The above described actions or operations occurring in the system render the system in a condition wherein the engine exhaust arrangement functions in a manner of conventional engine operation by reason of the interruption of air into the tubular members 18 and the exhaust manifold 16.

In order to recondition the system and restore air flow into the tubular passages 18, the engine is stopped. The manually operated switch 62 is then actuated by manual depression of the switch button 65, this action moving the switch member or arm 64 to its broken line position to de-energize the solenoid 68 of the latching relay 67. Concomitantly, the switch member 63 is moved to its broken line position to engage with a contact 79 energizing the solenoid 69 of the latching relay 67, which action disengages the switch member 72 from the contact 76 de-energizing the solenoid 46 of the valve means 32.

As the movable element of the valve means is spring biased, the valve element is repositioned with the air flow channel 48 in registration with the pipes 30 and 34, and the valve channel 50 moved to a closed position as shown by the solid line in FIG. 2. The filler cap or closure 51 is removed and the container 42 refilled with quenching fluid, such as water, the closure 51 replaced and an air pressure hose connected with the valve means 52 to again establish pressure on the fluid in the container 42.

At the completion of the above-described operations, the system is in condition for operation in a normal manner, that is, the feeding of air from the air pump 26 through the branch passages 36 into the tubular passageways 18 and the manifold 16 to promote oxidation in these regions. While the arrangement shown in FIGS. 1 and 2 is adapted for use with four cylinders of an eight cylinder engine, it is to be understood that a substantially identical system and arrangement are provided for the other four cylinders of the eight cylinder engine. Thus, there would be two manifolds 16, two sets of passageways 18, a duplication of the air flow system and the control circuitry and a second container 42 filled with flame or oxidation retardant or quenching fluid.

It is to be understood that while water is preferably used as the quenching or oxidation retarding fluid in the system, other quenching or oxidation retarding fluids may be employed for the purpose, such as water containing salt (saline solution) or a mixture of glycerin and water, a preferred mixture being sixty percent glycerin and forty percent water by weight. If desired, the manifold 16 may be equipped internally with a catalytic reactor or chemical reduction bed of a character for converting or chemically reducing oxides of nitrogen to nontoxic gases prior to delivery of the exhaust gases through the muffler 22 and tail pipe 24 to the atmosphere.

FIGS. 3 and 4 illustrate a modification of the method, system or apparatus of the invention wherein a catalytic reactor construction or unit containing a chemical reduction bed is embodied in the system and a means provided for preheating the air delivered into the exhaust manifold construction for promoting limited combustion in the manifold and for increasing the temperatures in the reaction or conversion zone of the catalytic reactor. FIG. 3 illustrates a portion of an engine block 12a of an eight cylinder V-type engine, the portion of the block 12a embodying four cylinders being provided with a cylinder head 14a.

Secured to one side of the cylinder block 12a is an exhaust manifold 16a providing a chamber 17a which receives exhaust gases from four cylinders of the eight cylinder engine through passages (not shown) similar to the passages 18 shown in FIG. 1. Connected with the manifold 16a is an exhaust gas conveying means or tube 84, the conveying means 84 being connected with a catalytic reactor construction or unit 86.

The reactor unit 86 contains a catalyst or chemical reduction bed (not shown) of a character effective to convert or reduce oxides of nitrogen to nontoxic gases, the reactor unit 86 being supplied with air in order to oxidize carbon monoxide and unburned hydrocarbons in the exhaust gases within the reactor unit 86. The outlet of the reactor unit 86 is connected to a gas passage means or tube 88 of a combined air preheating means and exhaust gas conveying construction 90, the pipe 88 conveying exhaust gases from the reactor unit into a sound attenuating device or muffler 92 thence through a tail pipe 94 to the atmosphere.

The air preheating construction or arrangement 90 comprises an exterior tubular means, pipe or member 96 surrounding and spaced from the exhaust conveying pipe 88 providing an annular space, passage or chamber 98 between the pipes 88 and 96, as particularly shown in FIG. 5. The outer pipe 96 extends throughout a major portion of the length of the inner pipe 88, one end of the outer pipe 96 terminating at a region 100, the other end of the outer pipe terminating at the region 101 preferably adjacent the muffler 92.

At the regions 100 and 101, the annular passage 98 is closed either by welding the outer pipe in gas-tight engagement with the exterior of the inner pipe 88, or by other sealing means. The elongated annular passage 98 provides a chamber or passage accommodating flow of air therethrough whereby the heat of exhaust gases in the tube or pipe 88 is transferred to air in the annular passage 98 to increase the temperature of the air therein.

The preheated air in the annular passage 98 is utilized for establishing controlled, restricted or limited oxidation or combustion in the exhaust gases in the manifold chamber 17a and for supporting oxidation of oxidizable constituents in the exhaust gases flowing through the catalytic reaction chamber or unit 86.

The catalytic reactor construction or reactor unit 86 may be of the character disclosed and described in an application entitled System and Apparatus for Processing and Treating Exhaust Gases, Ser. No. 243,811, filed Apr. 13, 1972.

An engine driven air pump 26a or other source of air under pressure is connected by a tubular means or pipe 104 with a fitting 106 welded or otherwise secured to the outer pipe 96, as illustrated in FIG. 5, whereby the pipe 104 is in communication with the annular passage 98. Associated with the pipe 104 is a means, such as a valve means or restriction 38a, for limiting or controlling the amount or rate of air flow through the pipe 104 into the annular passage.

Disposed near the terminus 100 of the outer pipe 96 is a second fitting 108, similar to the fitting 106. As shown in FIG. 3, the cast metal cylinder block 12a of the engine construction is molded or cored with an elongated passage or air manifold 110 in communication with molded or cored branch channels or passages 112 in the cylinder block. The cored passageways or channels 112 are arranged to convey air into the regions of emission of exhaust gases from the engine cylinders into the chamber 17a provided by the manifold 16a to support limited oxidation of oxidizable constituents in the exhaust gases in the manifold 16a.

If desired, the air supply tubes 35 and 36, shown in FIG. 1, may be used in lieu of the cored passages or channels 110 and 112. An air conveying pipe or means 114 is connected with the fitting 108 and with a solenoid-actuated valve means 32a which is of the same character as that illustrated as 32 in FIG. 2 but without the air vent 78. With the flow channel 48a is in the movable valve element of the valve means 32a in the solid line position shown in FIG. 4, the channel 48a is in registration with pipes 114 and 111 providing passage means for conveying air to the cored passage 110 and branch channels or passageways 112 and into the manifold chamber 17a.

Connected with the pipe 114 is a pipe or tubular air conveying means 116 connected with branch pipes or tubes 118, the latter extending through openings in the wall of the housing of the catalytic reactor unit 86 for delivering heated air into the catalytic reactor construction. The air delivered into the catalytic reactor unit is for the purpose of oxidizing carbon monoxide and unburned hydrocarbons, the chemical reduction bed in the reactor unit converting or chemically reducing oxides of nitrogen to nontoxic gases.

Means is provided associated with the pipe 104 for interrupting air flow through pipe 104, annular chamber 98 and pipes 114, 116, 118 under certain conditions. As illustrated in FIG. 4, a solenoid-actuated valve 117 embodies a movable valve element having a flow channel 119 which, in solid line position, provides air flow through pipe 104, and in the broken line position interrupts air flow through the pipe 104 and vents air from the pump 26a to atmosphere through a vent 121. The energizable coil 122 is connected by conductors 123 and 77a with the controls in the housing 53a.

The preheating of the air for delivery into the manifold 16a and into the catalytic reactor construction 86 attains several advantages. By increasing the temperature of the air it is possible to lean out the fuel to air ratio at the carburetor or charge forming apparatus of the engine thereby increasing fuel economy, and utilizing waste thermal energy from the reactions occurring in the catalytic reactor unit 86 to heat the air results in lowering or reducing the temperatures of the exhaust gases delivered from the tail pipe 94. By preheating the air, the temperature of the air delivered into the catalyst or chemical reduction bed in the catalytic unit 86 is such that lower thermal energy requirements are necessary to achieve proper reaction temperatures in the unit 86.

Means is provided for supplying quenching or oxidation retarding fluid to the passageways or channels 110 and 112 and manifold 16a. A supply of quenching or oxidation retarding fluid may be provided in a container 42a, the container being connected by a pipe 120 with the solenoid-actuated valve means 32a. The manifold 16a is equipped with a temperature sensing or thermoresponsive means such as a thermocouple 54a which is connected with the circuitry in a housing 53a, the circuitry and components in the housing 53a being substantially the same as the circuitry and components illustrated in FIG. 2.

During normal operation of the engine with the system above-described, a limited or restricted amount of air from the air pump 26a is conveyed through the flow channel 119 in the solenoid-actuated valve 117 and pipe 104 into the elongated annular chamber or passage 98, and heat from the exhaust gases in the inner pipe 88 is transferred to the air in the passage 98 thus preheating the air. The preheated air flows through pipe 114 through the channel 48a in the valve means 32a and pipe 111 into the cored passageways 110 and 112 into the exhaust gases in the manifold 16a.

Limited oxidation or combustion of oxidizable constituents of the exhaust gases in the manifold 16a is controlled or regulated by air flow from the air pump 26a limited in amount by the valve means or restriction 38a or other means. Air from the pipe 114 is conveyed through the pipe 116 and branch pipes 118 into the catalytic reactor unit 86 to promote oxidation of carbon monoxide and unburned hydrocarbons, the delivery of heated air into the unit 86 increasing the rapidity of the reactions in the unit.

In event of malfunction, such as engine misfire, causing an increase in the amount of combustible mixture in the manifold 16a, combustion is thereby substantially increased resulting in increased temperatures at the region of the temperature sensing means or thermocouple 54a. The excessively high temperature acting on the thermocouple 54a increases electromotive forces in the circuit of the thermocouple illustrated in FIG. 2.

Through the circuitry and components contained in the housing 53a, the solenoid coil 46a of the valve means 32a is energized, shifting the movable valve element to a position interrupting air flow through the channel 48a and concomitantly, the solenoid coil 122 is energized to move the flow channel 119 to its broken line position interrupting air flow through pipe 104 and venting air from the pump through the vent 121. With the flow channels 48a and 119 in their broken line positions, air flow is interrupted so that no air flows through pipes 104, 111, 114, 116 and 118 into the manifold 16a or into the reactor 86. Concomitantly with this action, the channel 50a in the movable valve element of the solenoid-operated valve means 32a is shifted to the broken line position wherein the channel 50a establishes communication of the pipe 120, connected with the container 42a, with the pipe 111.

The quenching or oxidation retarding fluid, such as water, in the container 42a is under sufficient pressure to effect rapid flow of the quenching or oxidation retarding fluid through pipe 120, the flow channel 50a in the valve means 32a into the pipe 111, and through the cored passage 110 and branch passages 112 into the high temperature exhaust gases in the manifold or chamber 16a, quenching or retarding oxidation or combustion in the gases in the manifold chamber 17a. By reason of the rapid absorption of heat into the high heat capacity quenching fluid, the temperatures of the manifold 16a and the exhaust gases therein are rapidly reduced thus avoiding damage to components of the system.

The system may be reconditioned for normal operation in the same manner as hereinbefore described in connection with the system and apparatus shown in FIGS. 1 and 2. The engine is stopped, the pressurized container refilled with quenching fluid and pressurized, and the manually operated switch actuated by depressing the button 65a to release the latching relay means in the housing 53a thereby de-energizing the solenoid actuated valve 32a to re-establish an air flow path through the channel 48a in the valve means from the pipe 114 to the pipe 111, and interrupting delivery of quenching fluid through the valve channel 50a.

It is to be understood that the apparatus and system disclosed in FIGS. 3 through 5 are usable with one bank of four cylinders of an eight cylinder V-type engine and that a substantial duplication of the system disclosed and described is provided for the other bank of four cylinders of the engine, each system operating independently of the other.

FIG. 6 is illustrative of a container 124 adapted to be precharged and pressurized and containing an oxidation retarding or quenching fluid. The container is filled with the fluid, the container pressurized, and a metal diaphragm 126 applied to seal the filler opening 128. A tube 130 extends downwardly nearly to the bottom of the container, the upper end of the tube being fused or joined to the metal diaphragm 126 but normally closed by the diaphragm. A fitting 132, secured to an end of a fluid conveying tube, such as tube 44, shown in FIG. 2, or tube 120 shown in FIG. 4, is fashioned with a projection or diaphragm-puncturing means 136.

The tube is adapted for conveying quenching or oxidation retarding fluid within the container to the system shown in FIGS. 1 and 2, or the system shown in FIGS. 3 and 4. Thus, a container 124 provides an independent, replaceable unit in which the fluid is pressurized and the application of the container unit to the system involves joining the fitting 132 with the neck of the container defining the filler opening 128 whereby the projection 136 punctures the diaphragm 126 at the entrance of the tube 130, the fitting 132 with the neck of the container being a sealed type arrangement of conventional construction.

Utilizing the container construction shown in FIG. 6, it is practicable to supply containers 124 pressurized so that replacement of the quenching or flame retarding fluid in the system merely requires removing the discharged container and affixing a sealed pressurized container filled with quenching or combustion retarding fluid to the fitting 132.

FIGS. 7 and 8 illustrate an arrangement whereby a container or receptacle 148 is adapted to contain a supply of quenching or oxidation retarding fluid, the container being arranged to be pressurized by air from an air pump 140, the latter normally delivering air into the manifold 16b to promote limited or restricted oxidation in exhaust gases in the manifold. The air pump 140, driven by the engine or other suitable means, normally delivers air, limited or restricted in amount by the valve means or restriction 38b, through a pipe 142 and an air flow channel 143 in the movable valve element of a solenoid-operated valve means 144 thence through a pipe 146, an air manifold pipe 35b and branches 36b into the manifold 16b to promote limited or restricted oxidation of oxidizable constituents in exhaust gases delivered from the engine into the manifold. The manifold is provided with a temperature sensing means or thermocouple 54b connected with circuitry contained within a housing 53b for activating the solenoid-operated valve means 144.

The system illustrated in FIGURE 7 is inclusive of a receptacle or container 148 provided with a filler opening, normally closed by a cap 149, to facilitate filling the container 148 with water or other quenching or oxidation retarding fluid. Extending through an opening in the cover of the container and downwardly into the container is a tube or pipe 152 terminating in a horizontal portion 153 to which is secured a vertical tubular fitting 154. Fixedly supported within the container 148 is a member 156, an arm or member 157 being pivotally connected to member 156 by a pivot pin 158.

Secured to the member or arm 157 is a float or float member 159, the buoyancy of the float 159 being effective to normally maintain the member or arm 157 in its elevated position as shown in FIG. 8 when the receptacle 148 contains liquid. The distal end region of the arm 157 is provided with an elongated slot 160 to accommodate a pin 161 carried at the upper end of a valve rod 162. Slidably mounted in the tubular fitting 154 and secured to the valve rod 162 is a piston type valve 164 having a cone-shaped valve portion 165 at its lower end.

The lower end of the tubular fitting 154 is provided with a circular ledge portion 166 defining a passage 167. As will be apparent from FIG. 8, with the piston valve 164 in its elevated position, fluid in the container, when subjected to pressure, will flow through the passage 167 and pipe 152 into pipe 146, pipe 35b and branch pipes 36b into the manifold chamber 17b, this action occurring by reason of an engine misfire as hereinafter explained.

The fluid in the container 148 is pressurized by air from the air pump 140 through pipe 169, the air pressure being impressed in the container 148 when the air flow channel 143 is in the broken line position, as shown in FIG. 7, in registration with pipes 142 and 169. The outlet of the air pump 140 is provided with a vent pipe 171, a pressure relief valve or pressure limiting valve 172 being associated with the vent pipe. In this form of apparatus or system, the movable element of the solenoid valve means 144 has only a single flow channel 143.

The operation of the arrangement or system illustrated in FIGS. 7 and 8 is as follows: Under normal engine operation, the air pump 140 supplies a limited or restricted amount of air through pipe 142, channel 143 of the valve means 144, pipes 146, 35b and branch pipes 36b into the chamber 17b provided by the exhaust manifold 16b to provide for limited oxidation of unburned hydrocarbons and carbon monoxide in the exhaust gases in the chamber 17b. The air does not normally flow through the pipe 152 into the container 148 for the reason that the outlet of pipe 169 is blocked or closed by the position of the movable element of the solenoid-operated valve means 144.

In event of engine misfire or malfunction resulting in an abnormal increase in combustion or oxidation in the chamber 17b, the thermoresponsive means or thermocouple 54b is effective at a predetermined high temperature to initiate the activation of components in the control box 53b. The activation of components in the box 53b energizes the solenoid (not shown) of the valve means 144 to shift the movable element of the valve means whereby the channel 143 is moved to its broken line position, thereby effecting communication between the air supply pipe 142 and the pipe 169, the latter opening into the upper region of the receptacle 148 containing quenching or oxidation retarding fluid.

Under the influence of the buoyancy of the float 159, which is immersed in the fluid, the piston valve 164 is in its elevated position providing a flow path or passageway for the fluid through the passage 167, pipe 152, a portion of pipe 146, pipe 35b and branch pipes 36b into the manifold chamber 17b. With the flow channel 143 of the valve means 144 in the broken line position as shown in FIG. 7 air, under pressure from the air pump 140, flows through the pipe 142, flow channel 143, pipe 169 and into the upper region of the container 148.

The air pressure thus communicated to the container 148 forces the quenching or oxidation retarding fluid, such as water, rapidly through the passage 167 and into the manifold chamber 17b to rapidly reduce the temperatures of the exhaust gases and the manifold 16b below a critical point. Flow of quenching fluid continues into the manifold chamber 17b until the fluid in container 148 falls to a level below the float 159 whereby the weight or mass of the arm 157 moves the arm by gravity about the pivot axis 158 whereby the cone-shaped portion 165 of the piston valve 164 closes the passage 167 and the piston portion of the valve closes the entrance to the pipe 153, thus interrupting flow of quenching or oxidation retarding fluid into the manifold chamber 17b.

Under this condition, in order to prevent build up of air pressure in the container 148 and possible damage to the pump 140, the outlet of the pump 140 is provided with a vent 171 to the atmosphere and a pressure relief or regulating valve 172 is associated with the vent means so that the valve 172 provides for flow of air from the pump through the vent when the air pressure reaches a predetermined value to open the relief valve 172. The control circuitry in the housing 53b is substantially the same as the circuitry shown in FIG. 2.

In this form of the invention, only one flow channel 143 is provided in the solenoid-operated valve means 144 which diverts the air flow from a first position delivering a limited amount of air into the manifold chamber 17b for oxidation purposes to a second position interrupting air flow to the manifold chamber and pressurizing the fluid in the container 148 to force the fluid through pipe 152 into the manifold chamber 17b to reduce the temperatures of the exhaust gases and the manifold 16b. When the level of fluid is lowered in the container 148 until the valve 164 seats on the ledge 166, flow of quenching fluid is then interrupted.

After the engine malfunction is corrected, the system can be reconditioned by manipulation of the button 65b on the exterior of the housing 53b to manipulate the manually operated switch in the housing 53b which de-energizes the solenoid of the valve means 144 and the valve element is returned to its initial position under the pressure of a spring (not shown) in a conventional manner, which movement of the valve element re-establishes communication between the air flow pipes 142 and 146 through the channel 143. The filler cap 149 on the container is removed, a new charge of fluid delivered into the container and the cover 149 replaced.

FIG. 9 illustrates a modified form of system and apparatus for carrying out the method of the invention wherein the quenching or oxidation retarding liquid may be circulated from a supply such as water in the cooling system for the conventional internal combustion engine. In the system illustrated in FIG. 9, separate solenoid-actuated valves are utilized, one for controlling air flow, and the other for controlling flow of quenching or oxidation retarding fluid when utilized for quenching or oxidation retarding purposes. The arrangement shown in FIG. 9 is inclusive of an air pump 26c driven from the engine or other suitable means.

A first solenoid operated valve means 176 is provided with a movable valve element having a flow channel 178 normally in the position shown in full lines establishing communication between a pipe 180 and a pipe 181 for conveying air from the pump through pipe 35c and branch pipes 36c into the chamber 17c provided by the exhaust manifold 16c, the amount of air being limited or restricted by the valve means or restriction 38c.

The movable element of the valve means 176 is biased in one direction by a biasing spring (not shown) to normally maintain the flow channel 178 as shown in solid line position in FIG. 9. The valve means 176 is provided with a vent 182.

The system is inclusive of a second pump 184 driven by the engine or other suitable means, the pump having an inlet pipe 186 extending into or in communication with a container or receptacle 188 containing a supply of quenching fluid, such as water. The supply receptacle 188 may be a cooling radiator and associated flow passages and the quenching fluid may be the water or cooling liguid contained in the cooling system of the internal combustion engine.

It is to be understood that the receptacle 188 and the supply of quenching fluid therein may be independent of the engine and its cooling system. The outlet of the pump 184 is connected by a pipe 190 with a second solenoid-actuated valve means 192. The pipe 190 is in registration with a flow channel 193 in the movable element of the valve means 192 which is in a normal position, shown as a solid line in FIG. 9, blocking flow of quenching fluid at the valve means. Connected with the container 188 is a pipe 196 which is interconnected at the region 197 with the pipe 190.

The fluid pump 184 may be continuously operated during engine operation, effecting the circulation and recirculation of fluid from the container 188 through the pump and returned to the container through the pipe 196. The control circuitry in the housing 53c is associated with a conductor 200 connected with the solenoid coil 201 of the valve means 176. The conductor 200 is connected by a conductor 203 with a timer 204 of conventional construction, the timer being connected with the coil 205 of the second solenoid-actuated valve means 192.

The flow channel 193 in the movable element of the valve means 192 is maintained normally in the position indicated by the solid line under the influence of a spring 206 whereby the movable element of the valve means 192 blocks the flow of liquid in the portion of the pipe 190 above the juncture 197. The movable element of the valve means 192, when actuated by the energized solenoid coil 205, is moved to a position whereby the flow channel 193 is moved to the position indicated by the broken line establishing communication between pipe 190 and a pipe 209 in communication with pipe 181 whereby fluid from the pump 184 flows through pipe 209 and a portion of pipe 181 and pipes 35c, 36c into the manifold chamber 17c.

The function and operation of the apparatus or system illustrated in FIG. 9 is as follows: Under normal engine operation, a limited or restricted amount of air from the air pump 26c is conveyed through pipe 180, valve channel 178, pipes 181, 35c and 36c into the manifold chamber 17c for effecting limited oxidation of combustible constituents in the exhaust gases in the chamber. The solenoid coil 201 is normally de-energized so that the flow channel 178 of the valve means 176 is in the solid line position as shown in FIG. 9. The second pump 184, being driven by suitable means, effects circulation and recirculation of quenching fluid, such as water, from the receptacle through pipe 186 and the return pipe 196.

In event of engine misfire or other malfunction which increases the amount of combustible constituents in the manifold 16c, combustion or oxidation occurs in the chamber 17c increasing the temperature of the gases and the manifold 16c to a point activating the thermo-responsive means or thermocouple 54c which, in turn, activates the control components in the housing 53c in the manner hereinbefore described in connection with FIG. 2. The coil 201 of the valve means 176 is energized to shift the movable element of the valve means moving the flow channel 178 to its broken line position in registration with the vent 182.

This action interrupts flow of air into the manifold chamber 17c and directs the air from the air pump through the vent 182 to the atmosphere. Concomitantly, current flow is established through the conductor 203 and through the timer 204 to the coil 205 of the solenoid-actuated valve means 192, the solenoid moving the valve element whereby the flow channel 193 is moved to the broken line position establishing communication between the pipe 190 and the pipe 209.

Thus, when the flow channel 193 is in the broken line position, quenching or oxidation retarding fluid, under pressure from the pump 184, flows through pipe 190, valve flow channel 193, pipe 209, the lower portion of pipe 181 and pipes 35c, 36c into the manifold 16c to rapidly quench the hot gases and retard oxidation in the manifold 16c substantially reducing the temperatures of the exhaust gases and the manifold 16c.

The timer 204 is set to time out after a certain period of time de-energizing the coil 205 of the valve means 192 whereby the flow channel 193 is moved to its solid line position interrupting further flow of quenching fluid into the manifold 16c. The timer 204 is adjusted or set so that only a portion of the fluid in the supply receptacle 188 sufficient to effect proper quenching is delivered into the manifold chamber.

The system may be reconditioned as hereinbefore described by depressing the switch button 65c which de-energizes the solenoid coil 201 through the circuitry illustrated in FIG. 2 to return the valve element under spring pressure to a position returning the flow channel to its solid line position and re-establish air flow from the pump 26c into the manifold 17c. The timer 204 is reset so that upon current flow through conductor 200, the timer is rendered effective to again complete the circuit through the solenoid 205 of valve means 192 to effect delivery of quenching or oxidation retarding fluid into the manifold 16c in event of another misfire condition occurring in the engine.

It is to be understood that the arrangements or systems illustrated in FIGS. 7 and 9 may be utilized with the exhaust conveying and catalytic reactor system shown in FIGS. 3 through 5. The arrangements shown in FIGS. 7 and 9 are for use with a bank or group of four cylinders of an eight cylinder engine and that the same or similar system is employed with the other four cylinders of a V-type engine. The systems illustrated for use with four cylinders may be utilized as a complete system for four cylinder or six cylinder engines where the exhaust gases are delivered into a single manifold. The system may also be utilized with two cylinder engines of the reciprocating piston type and with rotary internal combustion engines.

It is apparent that, within the scope of the invention, modifications and different arrangements may be made other than as herein disclosed, and the present disclosure is illustrative merely, the invention comprehending all variations thereof.

I claim:

1. The method of controlling temperatures of exhaust gases emitted from an internal combustion engine into a passage in which oxidation is occurring of unburned constituents in the exhaust gases including sensing the temperature of the exhaust gases in the passage by a temperature sensor, activating the sensor at a predetermined high temperature of the exhaust gases, and flowing a quenching liquid upon activation of the sensor into the exhaust gases to reduce the temperatures of the gases.

2. The method of controlling temperatures of exhaust gases emitted from an internal combustion engine into a passage in which oxidation is occurring of unburned constituents in the exhaust gases including sensing the temperature of the exhaust gases in the passage by a temperature sensor, activating the sensor by the heat of the exhaust gases at a predetermined high temperature, and delivering a quenching liquid under pressure upon activation of the sensor into the exhaust gases to rapidly reduce the temperature of the exhaust gases.

3. The method of controlling temperatures of exhaust gases emitted from an internal combustion engine into a passage in which oxidation of unburned constituents in the exhaust gases is promoted by flowing a limited amount of air into the exhaust gases including sensing the temperature of the exhaust gases in the passage, interrupting the flow of air into the exhaust gases through the medium of the sensor when the gases attain a predetermined high temperature, and delivering a heat-absorbing fluid into the high temperature gases to reduce the temperature of the gases.

4. The method of controlling temperatures of exhaust gases emitted from an internal combustion engine into a manifold chamber in which limited oxidation of unburned constituents in the exhaust gases is promoted by flowing a controlled amount of air into the exhaust gases including reducing flow of air into the exhaust gases when the exhaust gases reach a predetermined high temperature, and concomitantly feeding an oxidation retarding fluid into the exhaust gases to thereby reduce the temperature of the gases.

5. The method of controlling temperatures of exhaust gases emitted from an internal combustion engine into a manifold in which oxidation of unburned constituents in the exhaust gases is promoted by flowing a limited amount of air into the exhaust gases including interrupting flow of air into the exhaust gases when the temperature resulting from oxidation occurring in the manifold becomes excessive, and concomitantly feeding a quenching fluid into the exhaust gases to quench the oxidation and thereby reduce the temperature of the exhaust gases and the temperature of the manifold.

6. The method of controlling temperatures of exhaust gases emitted from an internal combustion engine into a manifold in which oxidation of unburned constituents in the exhaust gases is promoted by flowing a limited amount of air into the exhaust gases including interrupting flow of air into the exhaust gases when the temperature of the exhaust gases becomes abnormally high, concomitantly feeding a nonoxidizable medium into the exhaust gases, and reducing oxidation by the medium to rapidly reduce the temperature of the exhaust gases and the temperature of the manifold.

7. The method of controlling temperatures of exhaust gases emitted from an internal combustion engine into a chamber including flowing air into the exhaust gases promoting oxidation of unburned constituents in the exhaust gases, flowing the exhaust gases from the chamber through a passage, transferring heat from the gases in the passage to the air flowing into the exhaust gases for preheating the air, sensing the temperature of the gases in the chamber by a temperature sensor, interrupting through the medium of the temperature sensor the flow of preheated air into the exhaust gases when the gases attain a predetermined high temperature, and delivering an oxidation retarding fluid into the exhaust gases concomitantly with the interruption of the flow of preheated air.

8. The method of controlling temperatures of exhaust gases emitted from an internal combustion engine into a chamber including flowing air into the exhaust gases promoting oxidation of unburned constituents in the exhaust gases, flowing exhaust gases from the chamber into a catalytic reactor, sensing the temperature of the exhaust gases in the chamber by a temperature sensor, interrupting through the medium of the temperature sensor the flow of air into the exhaust gases in the chamber when the gases attain a predetermined high temperature, and delivering a quenching fluid into the exhaust gases in the chamber concomitantly with the interruption of the flow of air to rapidly reduce the temperature of the exhaust gases.

9. The method of controlling temperatures of exhaust gases emitted from an internal combustion engine into a chamber in which limited oxidation of unburned constituents in the exhaust gases is promoted by flowing air into the exhaust gases in the chamber, flowing exhaust gases from the chamber into a catalytic reactor, flowing exhaust gases from the reactor through a passage, transferring heat from the exhaust gases in the passage to the air flowing into the exhaust gases in the chamber for preheating the air, flowing preheated air into the catalytic reactor, sensing the temperature of the exhaust gases in the chamber by a temperature sensor, interrupting through the medium of the temperature sensor the flow of preheated air into the exhaust gases in the chamber when the gases attain a predetermined high temperature, and delivering a heat-absorbing oxidation-retarding fluid into the exhaust gases in the chamber concomitantly with the interruption of the flow of preheated air into the chamber.

10. The method of controlling temperatures of exhaust gases emitted from an internal combustion engine into a passage in which limited oxidation of unburned constituents in the exhaust gases is promoted by delivering air from an air pump into the exhaust gases, sensing the temperature of the exhaust gases in the passage by a temperature sensor, establishing a supply of oxidation retarding fluid in a container, interrupting through activation of the temperature sensor the flow of air into the exhaust gases in the passage when the gases attain a predetermined high temperature, and upon interruption of air flow into the exhaust gases, diverting air from the air pump into the container to establish pressure in the container, delivering oxidation-retarding fluid under the influence of the pressure in the container into the exhaust gases in the passage to rapidly reduce the temperature of the gases in the passage, and interrupting delivery of oxidation-retarding fluid when a predetermined quantity of oxidation-retarding fluid is delivered from the container into the gases in the passage.

11. The method of controlling temperatures of exhaust gases emitted from an internal combustion engine into a passage in which limited oxidation of unburned constituents in the exhaust gases is promoted by flowing a limited amount of air into the exhaust gases in the chamber, providing a supply of oxidation retarding fluid in a receptacle, circulating and recirculating the fluid through channel means in communication with the receptacle, sensing the temperature of the exhaust gases in the passage by a temperature sensor, interrupting through the medium of the temperature sensor the flow of air into the exhaust gases when the gases attain a predetermined high temperature, delivering oxidation-retarding fluid from the receptacle into the passage concomitantly with the interruption of air flow into the exhaust gases to rapidly quench the exhaust gases to reduce the temperature of the exhaust gases, and interrupting delivery of oxidation-retarding fluid into the exhaust gases in the passage when a predetermined amount of oxidation-retarding fluid from the container has been delivered into the exhaust gases in the passage.

12. Apparatus for controlling temperature of exhaust gases emitted from an internal combustion engine into passage means in which oxidation is occurring of unburned constituents in the exhaust gases comprising, in combination, a supply of quenching liquid, temperature responsive means associated with the passage means, and means rendered effective by the temperature responsive means at a predetermined high temperature of the exhaust gases to effect delivery of quenching liquid from the supply into the exhaust gases to reduce the temperature of the gases and the passage means.

13. An overtemperature control system for exhaust gases emitted from an internal combustion engine into a passage means in which oxidation of unburned constituents in the exhaust gases is promoted by flowing air into the exhaust gases comprising temperature responsive means disposed to be influenced by the temperature of the gases in the chamber means, means providing a supply of oxidation retarding fluid, and valve means rendered effective by the temperature responsive means at a predetermined temperature of the gases in the chamber for reducing flow of air into the gases and establishing flow of the oxidation-retarding fluid from the supply into the gases to reduce the temperature of the passage means.

14. The overtemperature control system according to claim 13 wherein the valve means is solenoid operated.

15. Apparatus for controlling temperatures of exhaust gases emitted from an internal combustion engine into passage means comprising, in combination, means providing a source of air under pressure, means for conveying air under pressure at a controlled rate from the source into the passage means to promote limited oxidation of unburned constituents in the exhaust gases in the passage means, means establishing a supply of oxidation retarding fluid, temperature responsive means associated with said passage means, and means rendered effective by the temperature responsive means at a predetermined hig temperature of the exhaust gases for interrupting flow of air into the passage means and concomitantly effect the delivery of oxidation retarding fluid from the supply to quench oxidation in the exhaust gases to rapidly reduce the temperature of the gases and the passage means.

16. The combination according to claim 15 including conveying means for conveying the exhaust gases from the passage means, and means associated with the conveying means for transferring heat from the gases in the conveying means to the air flowing into the passage means to preheat the air.

17. The combination according to claim 15 wherein the means rendered effective by the temperature responsive means is a solenoid-operated valve.

18. An overtemperature control system for exhaust gases emitted from an internal combustion engine into a passage means comprising, in combination, means establishing a source of air under pressure, means for delivering air from the source at a limited rate into the passage means to promote limited oxidation of unburned constituents in the exhaust gases in the passage means, a catalytic reactor arranged to receive exhaust gases from the passage means, tubular means connected with the catalytic reactor for conveying exhaust gases away from the catalytic reactor, valve means, temperature responsive means associated with the passage means, means associated with the exhaust gas conveying means for preheating air flowing into the passage means, a receptacle containing a supply of oxidation retarding fluid, said valve means being rendered effective by the temperature responsive means at a predetermined high temperature of the exhaust gases to interrupt the flow of air to the passage means and concomitantly effect delivery of oxidation retarding fluid from the supply into the exhaust gases in the passage means to quench the gases and thereby reduce the temperature of the gases and the temperature of the passage means.

19. An overtemperature control system according to claim 18 including means for conveying preheated air into the catalytic reactor.

20. Apparatus for controlling temperatures of exhaust gases emitted from an internal combustion engine into a manifold chamber including, in combination, means providing air under pressure, means for delivering the air under pressure at a controlled rate into the manifold chamber to promote limited oxidation of unburned constituents in the exhaust gases in the manifold chamber, a catalytic reactor arranged to receive exhaust gases from the manifold chamber, tubular means connected with the catalytic reactor for conveying exhaust gases away from the catalytic reactor, means associated with the tubular exhaust gas conveying means for transferring heat from the exhaust gases in said tubular means to increase the temperature of the air delivered into the manifold chamber, solenoid-operated valve means, temperature responsive means associated with the manifold chamber, a receptacle containing a supply of quenching fluid, and means rendered effective by the temperature responsive means at a predetermined high temperature of the exhaust gases to energize the solenoid-operated valve means to a position interrupting the flow of preheated air to the manifold chamber, said solenoid-operated valve means in its energized position delivering quenching fluid from the supply into the exhaust gases in the manifold chamber to quench the gases and thereby reduce the temperature of the gases and the temperature of the manifold chamber.

21. The apparatus according to claim 20 including means for conveying preheated air into the catalytic reactor for oxidizing oxidizable constituents in the exhaust gases in the reactor.

22. The combination according to claim 20 wherein the catalytic reactor embodies a chemical reduction bed for converting oxides of nitrogen to nontoxic gases.

23. The combination according to claim 20 including means rendered effective by the temperature responsive means under the influence of the reduced temperature of the gases to de-energize the solenoid-operated valve means restoring the valve means to its initial position.

24. Apparatus for controlling temperatures of exhaust gases emitted from an internal combustion engine into a passage means comprising, in combination, a first pump for pumping air, means for conveying from the pump a limited amount of air into the exhaust gases in the passage means to promote limited oxidation of unburned constituents in the exhaust gases, receptacle means containing a supply of quenching fluid, a second pump adapted to circulate and recirculate the fluid through fluid conveying means in communication with the receptacle means, a first solenoid-operated valve means for controlling the flow of air into the exhaust gases, means associated with the second pump adapted to convey the quenching fluid under high temperature conditions into the exhaust gases in the passage means, a second solenoid-operated valve means for controlling flow of quenching fluid into the exhaust gases in the passage means, a timer associated with the second solenoid-operated valve means, temperature responsive means associated with the passage means, means rendered effective by the temperature responsive means at a predetermined high temperature to energize the first solenoid-operated valve means to interrupt flow of air into the exhaust gases in the passage means and to energize through the timer the second solenoid-operated valve means to a position effecting delivery of quenching fluid from the supply into the exhaust gases in the passage means to rapidly quench the exhaust gases to reduce the temperature of the exhaust gases and the temperature of the passage means, said timer being set to time out and de-energize the second solenoid-operated valve means when a predetermined amount of quenching fluid has been delivered from the receptacle means into the exhaust gases in the passage means to interrupt delivery of quenching fluid.

25. Apparatus for controlling temperatures of exhaust gases emitted from an internal combustion engine into a passage means comprising, in combination, an air pump, means for conveying a limited amount of air from the air pump into the exhaust gases to promote limited oxidation of oxidizable constituents in the exhaust gases, a receptacle adapted to contain a quenching fluid, means establishing communication between the receptacle and the passage means, a solenoid-operated valve means associated with the means for conveying air into the passage means, tubular means establishing communication of the receptacle with the solenoid-operated valve means, said solenoid-operated valve means being normally in a position to convey air from the pump into the passage means, temperature responsive means associated with the passage means, said temperature responsive means being effective when the gases in the passage means attain a predetermined temperature to energize the solenoid-operated valve means to a position interrupting flow of air into the passage means and to establish communication of the air pump through the tubular means with the receptacle whereby air from the pump is directed into the receptacle to effect rapid delivery of the quenching fluid into the passage means to quench the exhaust gases in the passage means and thereby reduce the temperature of the exhaust gases and the temperature of the passage means, and means associated with the receptacle operable upon the delivery from the receptacle of a predetermined amount of quenching fluid to interrupt delivery of the quenching fluid.

* * * * *